3,152,955
AMINO ACIDS CONCENTRATE
James Gordon Gow and Jeremiah Milner, Liverpool, England, assignors to The Distillers Company Limited, Edinburgh, Scotland, a British company
No Drawing. Filed Mar. 21, 1962, Ser. No. 181,445
Claims priority, application Great Britain Dec. 22, 1960
12 Claims. (Cl. 167—65)

This application is a continuation-in-part of our application No. 161,260, filed December 21, 1961, now abandoned.

The invention relates to a method of preparation of an amino acid concentrate, and to compositions of matter containing such amino acids concentrate and intended for use medically. The medical use particularly envisaged is that of intravenous alimentation in mammals generally, but with special reference to the infusion of humans during early post-operative treatment.

L-amino acids are well known as essential components in the metabolism of the human body.

The supply of an L-amino acids concentrate to debilitated patients to aid recovery, particularly as post-operative treatment, is therefore of great value. However, such concentrates, when prepared by degradation of protein, have a varying spectrum of L-amino acids which depends on the source of the protein used as starting material and on the process of degradation employed, and which is not always suitable for administration to humans. Thus, the variety of L-amino acids in the concentrate is clearly restricted to that existing in the protein source, and if any of the more important amino acids is missing the therapeutic value of the concentrate is reduced. Moreover, during degradation of the protein to the L-amino acids, particularly by enzymatic means, hydrolysis is frequently incomplete and consequently the solution may not be wholly satisfactory for therapeutic use. Very often this problem is aggravated by the common failure to reproduce exactly the degree of degradation when using enzymes, thus leading to variation in L-amino acid composition from batch to batch.

Furthermore, many concentrates hitherto produced, in addition to presenting an unsatisfactory L-amino acid spectrum, are contaminated in a variety of ways, arising from for example incomplete hydrolysis of the protein. Such contaminants are frequently pyrogenic in nature, or give rise to hypersensitivity reactions. They are thus clearly unsuitable for intravenous administration.

In addition, some L-amino acid concentrates are found to be of an acid pH which is not readily adjusted to pH 7. They are thus unsuitable for prolonged intravenous administration, particularly in those cases where it is necessary to supply the patient with the whole of his nutritional requirements in this manner.

It is an object of the present invention to provide a process for the production of an amino acids concentrate wherein the concentrate presents a satisfactory amino-acids spectrum for intravenous administration to humans as an aid to metabolism, and is substantially pure and free from contamination by undesirable protein degradation products.

It is a further object of the present invention to provide an amino acids concentrate which is readily adjustable to physiological pH and which on intravenous administration does not give rise to any significant development of pyrogenic or hypersensitivity effects.

Accordingly, the present invention comprises a method of preparing an amino acids concentrate suitable for human intravenous administration which comprises subjecting animal serum protein to acid hydrolysis, and subsequently treating the amino acid hydrolysate so produced with an ion exchange resin capable of removing the hydrolysis acid from the hydrolysate.

It is preferred to effect the acid hydrolysis with hydrochloric acid, as after hydrolysis much of the excess hydrochloric acid can be boiled off before the treatment with ion exchange resins.

It is further preferred that the amino acid hydrolysate is treated with activated carbon, both before and after treatment with ion exchange resins.

In one preferred process, animal serum protein is subjected to hydrochloric acid hydrolysis, the hydrolysate is repeatedly distilled to low volume, diluted with water, and redistilled thereby removing much of the excess hydrochloric acid.

The final product at this stage is diluted with water and should then be approximately 4 N with respect to hydrochloric acid and should contain approximately 40% w./v. of mixed amino-acids. It is then clarified with activated carbon, treated with ion exchange resins to remove substantially all the hydrochloric acid, and finally again treated with activated carbon.

In a particularly preferred embodiment of the invention, the animal serum protein used is bovine serum protein. The amino acid concentrate derived from this protein is of high purity, has a spectrum eminently suitable for intravenous administration to the human patient, and is readily adjustable to physiological pH. Moreover whole bovine serum may be used without preliminary separation of the bovine serum protein.

In order to render the amino acids concentrate in a form suitable for intravenous administration as a composite solution, it is normally desirable to add thereto any essential amino acids lost in the process, any required vitamins, and an energising solution of a sugar in aqueous alcoholic solution. It is desirable that the composite solution should be clear, sterile and of pH 6.8–7.2. The composite solution should contain all the known amino acids in the approximate proportions in which they occur in the blood serum proteins normally present in mammals and be, in consequence, compatible with the blood streams thereof. This compatibility has been demonstrated in clinical trials which will be referred to in detail hereinafter.

Thus, the invention further comprises a composition of matter derived from such amino acids concentrate and adapted for use medically comprising a solution of said amino acids concentrate of pH 6.8–7.2 and which is supplemented, if necessary by selected amino acids, and by vitamins and by a metabolisable sugar.

Apart from supplying energy, the metabolisable sugar, for example glucose, sucrose or fructose, appears to assist in the uptake of the amino acids themselves and prevents or reduces the amount of such acids which is excreted unmetabolised. Fructose is particularly valuable for the purpose as a high concentration of fructose can be administered without physiological damage. Thus up to 12%–15% weight/volume solution of fructose can be administered intravenously, whereas the safe maximum for glucose is possibly not more than about 5%. Where even the maximum safe level of fructose does not supply the desired amount of calories in the preparation, then ethanol may be added to supply the deficit, up to about 5% w./v. On administration, where ethanol is included in the amino acids concentrate, it is recommended that not more than 10 ml. ethanol per hour should be received intravenously by the patient.

It is further preferred that in such compositions of the present invention, the amino acids concentrate component does not supply more than 20% of the total calories of the composition.

A preferred composition comprises the amino acids concentrate, fructose, alcohol and potassium and sodium chlorides.

Vitamins as required may be added, and in one specific composition the analysis is:

| | | |
|---|---|---|
| Amino acids | gm | 4 |
| Fructose | gm | 12–15 |
| Alcohol | gm | 3–5 |
| pH | | 6.8–7.2 |
| Sodium chloride | gm | 0.37 |
| Potassium chloride | gm | 0.335 |
| Sodium pantothenate | mg | 4 |
| Pyridoxine hydrochloride | mg | 1.8 |
| Cyanocobalamin | μg | 4 |

Water to 100 ml.

Where the term "water" appears in this application, "pyrogen-free water" is intended.

The invention will be further understood by reference to the following description of the preparation of an amino acids concentrate, and a composition prepared therefrom.

The bovine serum protein is prepared using conventional means, washed with water, and then precipitated by salting out and centrifuging, or, alternatively, is concentrated by direct evaporation. Drying may be carried out for example, by means of (1) hot air; (2) steam ovens; (3) vacuum ovens; or (4) freeze drying.

While it is preferred to utilise a dried product for the acid hydrolysis step, it is possible to hydrolyse the washed serum protein directly.

The acid hydrolysis is preferably carried out using hydrochloric acid. When the serum protein is used in powder form, it is dissolved in warm concentrated hydrochloric acid of strength 12 N, employing 2 litres of hydrochloric acid per 1 kg. serum powder, and is refluxed for 6 hours. At the end of this time 98% of the original protein is converted into its individual amino acids. The conditions of acid hydrolysis are variable in that a less concentrated acid, e.g., 5–6 N acid, would require 10 hours. Whilst the strength of the HCl is not critical, it is necessary that it should not be less than that of a constant boiling mixture. Where washed undried serum protein is employed, the HCl strength should approximate to 12 N if at all possible.

The hydrolysate is transferred for vacuum distillation whereby to remove some of the HCl. The distillation is continued until the residue becomes almost solid. This thick, tarry, residue consists of amino acids in the hydrochloride form. The residue is dissolved next in water to give approximately 40% of solids. This aqueous amino acids solution is then boiled with one kilogramme of active charcoal for the purpose of removal of colour and pyrogenic compounds. Any active charcoal may be used, but the ones preferred are a Norit (registered trademark) decolourising grade or Actibon XP. Boiling is continued until the filtered solution is clear and pale yellow. The final volume of the aqueous amino acids solution is preferably 2.5 litres and the solution will be approximately 4 N, hydrochloric acid with a nitrogen content of 54 mg. per ml.

The following stages are conducted under conditions of pharmaceutical cleanliness.

The solution, now of 4 N strength and containing approximately 40% amino acids is treated with an ion exchange resin which has the property of removing the hydrochloric acid, but which allows the amino carboxylic acids to pass through. It will be found convenient to use an ion exchange resin of the Deacidite type, either Deacidite G or E, which is converted to the hydroxyl form and suspended in water. The size of the column varies with the quantity of amino acids that is required and the solution is passed through preferably by gravity feed at a rate sufficient to ensure replacement of chloride ions by hydroxyl ions and to produce a solution having a pH in the range 6.8–7.0 after washing the resin with sufficient apyrogenic water to remove adsorbed amino acids. Usually about 2 volumes of water (relative to the volume of ion exchange resin) are required. A typical column is 6" in diameter and 24" or 48" high.

In the preferred embodiment of the invention, the resulting amino acids solution is treated with fresh active charcoal, said charcoal having the property of selective adsorption of aromatic amino acids. Particularly suitable are Norit (registered trademark) and CECA (registered trademark) charcoals. This adsorption step is particularly important since it brings about not only a purification of the solution as a whole but also reduces the tyrosine content thereof without reduction in the aliphatic amino acids. It is necessary that tyrosine be reduced to below a level of 0.08 gm. per 100 ml. of the composition solution prepared for injection, since its solubility is such that there is a tendency for it to crystallise out in the composite solution derived therefrom prior to intravenous administration. This step also removes the phenyl-alanine simultaneously, and since either tyrosine or phenyl-alanine is essential to animal metabolism and complement one another, it is necessary to added further phenyl-alanine to the concentrate after charcoal treatment. It is preferable to restore the level of phenyl-alanine since this substance has a considerably greater solubility than has tyrosine.

It may be convenient, where the final composite solution for injection is of such concentration as to require its components to have a specific solubility to extract the non-essential amino acids having an insufficiently high solubility at this stage by the choice of a suitable adsorbent.

The purified solution of amino acids is then filtered and is clear and pale yellow. It is then treated with the requisite amount of potassium chloride (calculated such that the final formulated solution will contain 45 m. eq. potassium ions per litre). Sufficient sodium ions are already present at this stage. This solution is pyrogen-free and free of possible bacterial contamination.

Since it is desirable that the composite solution for injection should contain the amino acids essential for metabolism, it is found expedient to replace not only the phenyl-alanine referred to above at a level of about 3 gm./per 100 gm. mixed amino-acids, but to incorporate dl-tryptophane, an amino acid lost in the acid hydrolysis step, in amount equivalent to about 3 gm. tryptophane per 100 gm. amino acids. DL-methionine may also be added to bring the level up to about 6 gm. per 100 gm. of amino acids. Vitamins are desirably added for example pyridoxine hydrochloride and cyanocobalamin. Sodium pantothenate is also found to be a desirable component.

In the preparation of the composite solution, the vitaminised amino acid solution is then added rapidly to an equal quantity of the energy solution which conveniently consists of 24% fructose and 8% ethanol, made up in water, at a temperature not exceeding 20° C.

While it is possible that metabolisable sugars other than fructose may be used to energise the composite solution, fructose is believed to be ideal in that there is no excessive excretion in the urine, urinary wastage of amino acids is reduced, fructose is more rapidly removed than, say, glucose from the blood stream and it further increases the rapidity of the metabolism of alcohol. Additionally, fructose permits a much larger number of calories to be given because a 12–15% solution of fructose can be administered intravenously with a reduced risk of vein thrombosis.

The resulting composite solution is then Seitz filtered. After forming the composite solution filtering should not be delayed more than 15 minutes.

The final solution should be clear, and should store indefinitely. The concentration of amino acids, fructose and alcohol should be so balanced that two litres of the solution will supply the equivalent of 80 grammes of first-class protein and 2000 calories. This quantity can be safely infused in twenty to twenty-four hours in an adult in absence of administration of other liquids, and is immediately active in the cellular structure.

In the aforementioned formulation of the composite solution according to the invention, the amino acids referred to therein comprise on analysis:

| | Gm./100 gm. protein |
|---|---|
| L-lysine | 7.51 |
| L-arginine | 5.08 |
| L-histidine | 2.32 |
| L-cystine | 2.20 |
| DL-methionine | 6.00 |
| DL-tryptophane | 3.00 |
| L-threonine | 6.84 |
| L-serine | 6.84 |
| L-proline | 6.05 |
| L-glutamic acid | 11.25 |
| L-aspartic acid | 10.49 |
| L-tyrosine | 0.80 |
| L-valine | 6.85 |
| DL-phenyl-alanine | 3.00 |
| L-isoleucine | 2.66 |
| L-leucine | 7.76 |
| L-glycine | 4.64 |
| L-alanine | 5.64 |

The clinical trials referred to previously may be conveniently summarised as follows:

(1) There was no evidence of intravenous thrombosis even after 7 bottles of the composite solution had been given continuously over a period of 48 hours.
(2) In no patient was more than a trace of reducing sugar isolated from the urine.
(3) Only small quantities of amino nitrogen were extracted in the urine, and in patients who had been starved prior to the infusion all the amino nitrogen infused was utilised.
(4) Only normal quantities of sodium and potassium were excreted in the urine over a period of 24 hours after infusion.
(5) There was no incident of a general reaction and no evidence of any excessive pyrogen response.

Generally, it is anticipated that such a composite solution will have a maximum benefit in patients who, during the post-operative period are unable to have oral feeding or in whom, prior to surgery, protein depletion had occurred, and also in patients who are suffering from debilitating diseases such as ulcerative colitis.

We claim:

1. A process of preparing an amino acids concentrate suitable for human intravenous administration, which comprises subjecting animal serum protein to acid hydrolysis, and subsequently treating the amino acid hydrolysate so produced with an ion-exchange resin capable of removing the hydrolysis acid from the hydrolysate.

2. A process according to claim 1 wherein the animal serum protein is bovine serum protein.

3. A process according to claim 1 wherein the acid hydrolysis is carried out with hydrochloric acid.

4. A process according to claim 1 wherein the amino acid hydrolysate is treated with activated carbon before and after treatment with the ion exchange resin.

5. A process for the production of an amino acids concentrate suitable for human intravenous administration, which comprises heating bovine serum protein with hydrochloric acid until the protein is hydrolysed to amino acids, distilling off excess hydrochloric acid, redissolving the residue in water to give a solution containing about 40% weight/weight of solids, heating this solution with activated charcoal, filtering, diluting the filtrate with water if necessary to give a strength of hydrochloric acid in the filtrate of below about 4 N, treating the filtrate with an ion exchange resin capable of absorbing the remaining hydrochloric acid but not the amino acids, and finally subjecting the solution of amino acids so produced to a further treatment with activated charcoal.

6. A process according to claim 5 wherein the bovine serum protein is hydrolysed in a hydrochloric acid solution of strength at least that of a constant boiling mixture, and preferably of a strength about 12 N.

7. A composition of matter for intravenous administration comprising an amino acids concentrate prepared according to claim 2, a metabolisable sugar and ethanol.

8. A composition of matter for intravenous administration comprising an amino acids concentrate prepared according to claim 2, a metabolisable sugar, ethanol, vitamins and potassium and sodium chlorides.

9. A composition of matter for intravenous administration comprising an amino acids concentrate prepared according to claim 5, fructose, ethanol, vitamins and potassium and sodium chlorides and added L-phenyl alanine and L-methionine.

10. A composition of matter according to claim 9, in which the vitamins include:

| | | |
|---|---|---|
| Amino acids | grams | 4 |
| Fructose | do | 12–15 |
| Alcohol | do | 3–5 |
| Sodium chloride | do | 0.37 |
| Potassium chloride | do | 0.335 |
| Sodium pantothenate | mg | 4 |
| Pyridoxin hydrochloride | mg | 1.8 |
| Water to 100 ml. | | | and having a physiologically acceptable pH.

11. A composition of matter according to claim 10, and having a pH in the range 6.8–7.2.

12. A method of treating post-operative patients unable to have oral feeding and pre-operative patients suffering from protein depletion which comprises intravenously injecting into such patients a composition according to claim 8.

References Cited in the file of this patent

UNITED STATES PATENTS

| 2,462,597 | Block | Feb. 22, 1949 |
|---|---|---|
| 2,666,012 | Ferguson | Jan. 12, 1954 |
| 2,666,013 | Ferguson | Jan. 12, 1954 |
| 2,669,559 | Reid | Feb. 16, 1954 |
| 2,680,744 | Howe et al. | June 8, 1954 |
| 2,738,299 | Frost et al. | Mar. 13, 1956 |
| 2,823,167 | Newmark | Feb. 11, 1958 |
| 2,835,627 | Conine et al. | May 20, 1958 |
| 2,874,089 | Zuck | Feb. 17, 1959 |
| 2,937,974 | Ferguson | May 24, 1960 |
| 2,939,820 | Gerber et al. | June 7, 1960 |
| 2,939,821 | Freedman et al. | June 7, 1960 |
| 2,958,630 | Keil et al. | Nov. 1, 1960 |
| 2,959,520 | Kawajiri | Nov. 8, 1960 |
| 2,999,792 | Segre | Sept. 12, 1961 |
| 3,003,918 | Sanders et al. | Oct. 10, 1961 |
| 3,016,334 | Lewis | Jan. 9, 1962 |
| 3,024,167 | Damaskus | Mar. 6, 1962 |
| 3,033,753 | White et al. | May 8, 1962 |
| 3,046,198 | Harper | July 24, 1962 |
| 3,057,781 | Mace et al. | Oct. 9, 1962 |
| 3,066,079 | Hagan et al. | Nov. 27, 1962 |
| 3,067,098 | Pool | Dec. 4, 1962 |
| 3,073,747 | Reid | Jan. 15, 1963 |